US012651776B2

(12) United States Patent
Demeaux et al.

(10) Patent No.: US 12,651,776 B2
(45) Date of Patent: Jun. 9, 2026

(54) FLUORINATED ELECTROLYTE COMPOSITION FOR AN ELECTROCHEMICAL CELL HAVING A LITHIUM OR LITHIUM ALLOY ANODE

(71) Applicant: SAFT, Levallois-Perret (FR)

(72) Inventors: Julien Demeaux, Bruges (FR); Marlène Oswald, Blanquefort (FR)

(73) Assignee: SAFT, Levallois-Perret (FR)

( * ) Notice: Subject to any disclaimer, the term of this patent is extended or adjusted under 35 U.S.C. 154(b) by 549 days.

(21) Appl. No.: 18/032,683

(22) PCT Filed: Oct. 8, 2021

(86) PCT No.: PCT/EP2021/077864

§ 371 (c)(1),
(2) Date: Apr. 19, 2023

(87) PCT Pub. No.: WO2022/096220

PCT Pub. Date: May 12, 2022

(65) Prior Publication Data

US 2024/0006662 A1 Jan. 4, 2024

(30) Foreign Application Priority Data

Nov. 6, 2020 (FR) ....................................... 2011417

(51) Int. Cl.
*H01M 10/0569* (2010.01)
*H01M 10/0565* (2010.01)

(52) U.S. Cl.
CPC ... *H01M 10/0569* (2013.01); *H01M 10/0565* (2013.01); *H01M 2300/0034* (2013.01); *H01M 2300/0085* (2013.01)

(58) Field of Classification Search
None
See application file for complete search history.

(56) References Cited

U.S. PATENT DOCUMENTS

2015/0050561 A1 2/2015 Zhang et al.
2015/0357642 A1* 12/2015 Xing ...................... C01G 53/52 252/182.1
2018/0069267 A1 3/2018 Suzuki et al.

FOREIGN PATENT DOCUMENTS

CN 109449487 A 3/2019
CN 109449511 A * 3/2019 ........ H01M 10/0525
JP 2019-133773 A 8/2019

OTHER PUBLICATIONS

International Search Report for PCT/EP2021/077864 dated Feb. 4, 2022.

* cited by examiner

*Primary Examiner* — Carlos Barcena
(74) *Attorney, Agent, or Firm* — Sughrue Mion, PLLC

(57) ABSTRACT

The invention relates to an electrochemical cell comprising: —at least one anode comprising metallic lithium or a lithium alloy or at least one anode comprising a current collector at least partially covered with metallic lithium deposited after at least one charge of the cell, the cell not containing metallic lithium at the time of its manufacture, —at least one cathode, —a liquid or gelled electrolyte composition comprising: a) a solvent comprising: i) either a mixture of 1,1,1,3,3,3-hexafluoro-2-methoxypropane (HFMP) and/or 1,1,1,3,3,3-hexafluoro-2-(fluoromethoxy)propane (HFMFP), ethylene monofluorocarbonate (F1EC) and 2,2,2-trifluoroethyl methyl carbonate (F3EMC), ii) or a mixture of 1,1,1,3,3,3-hexafluoro-2-methoxypropane (HFMP) and/or 1,1,1,3,3,3-hexafluo-ro-2-(fluoromethoxy)propane (HFMFP), ethylene monofluorocarbonate (F1EC) and 2,2,2-trifluoroethyl acetate (F3EA), b) at least one salt whose cation is the lithium cation, c) lithium difluorophosphate $LiPO_2F_2$ in an amount representing from 0.05 to 5% of the mass of the combination made up of the solvent and said at least one dissolved lithium salt.

18 Claims, 6 Drawing Sheets

[Fig. 1]
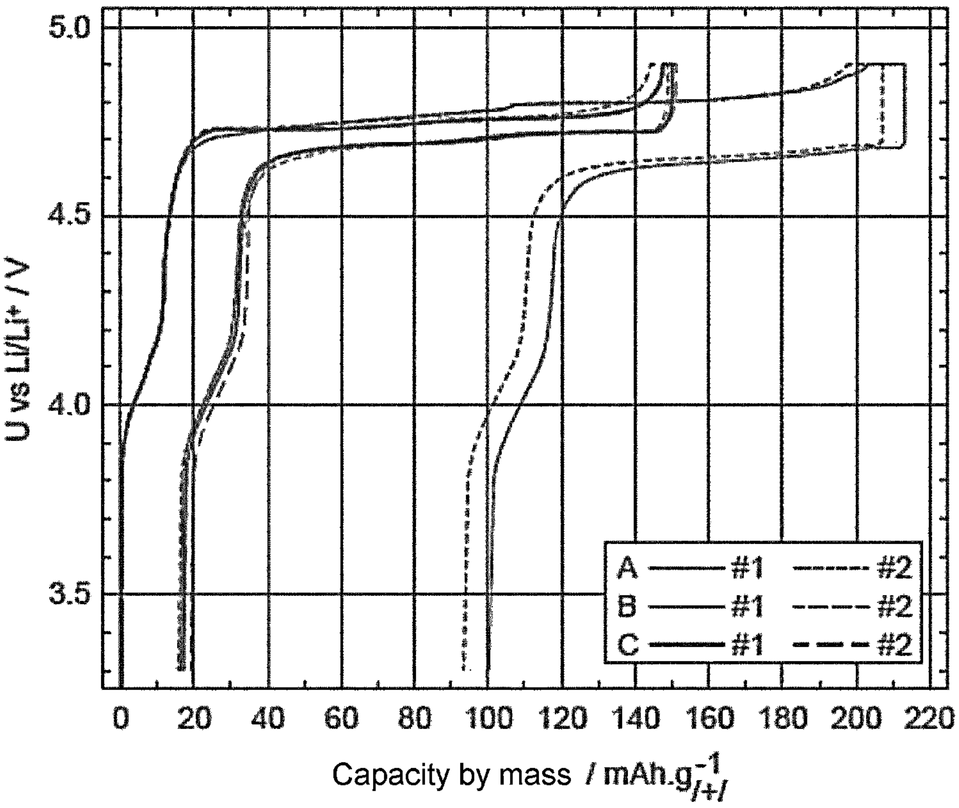
[Fig. 2a]
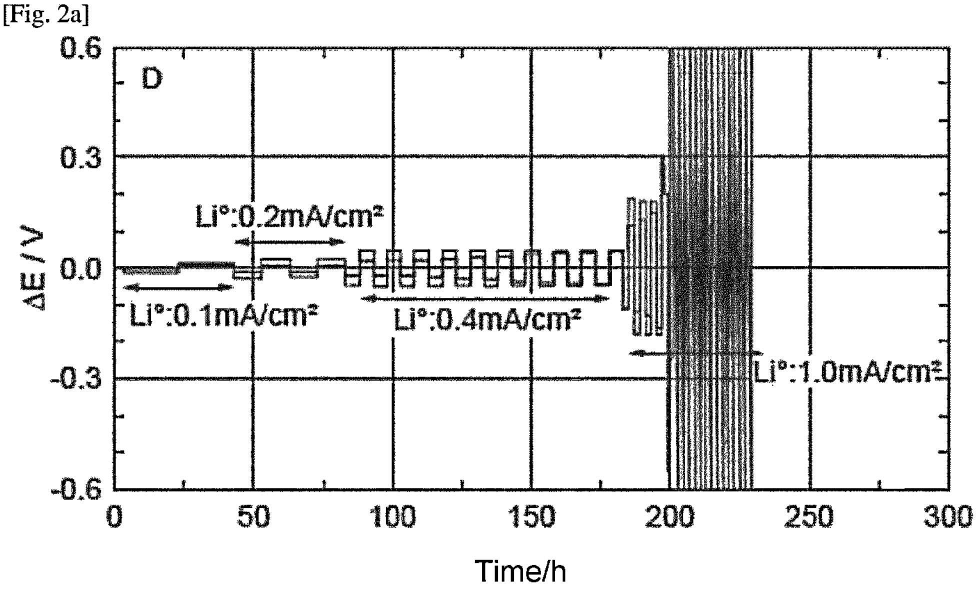

[Fig. 2b]
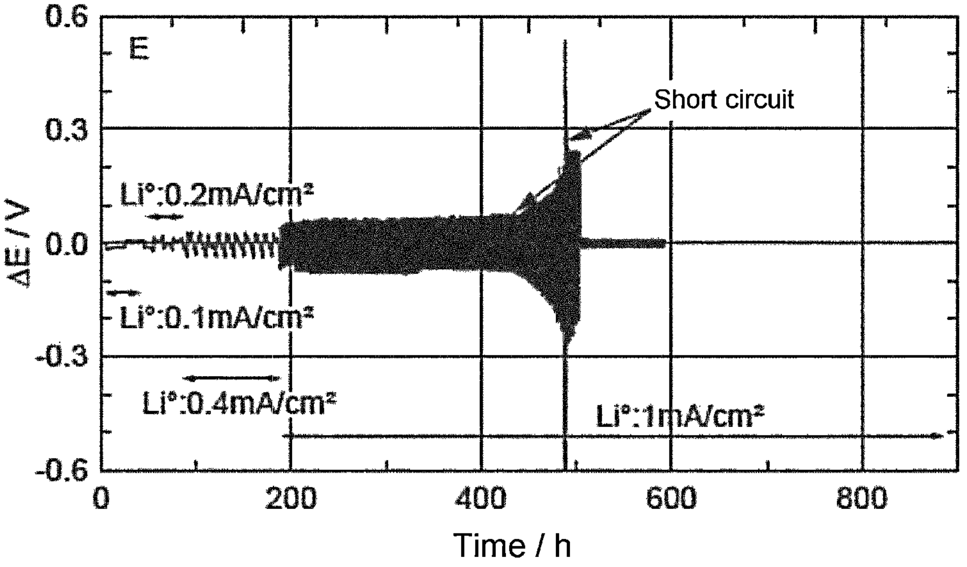
[Fig. 3]
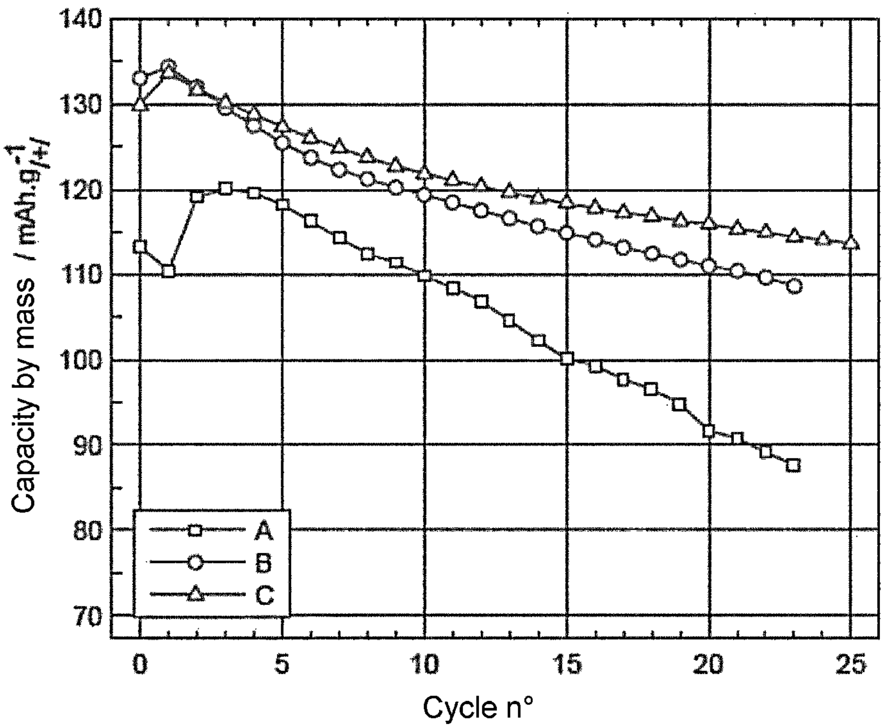

[Fig. 4]
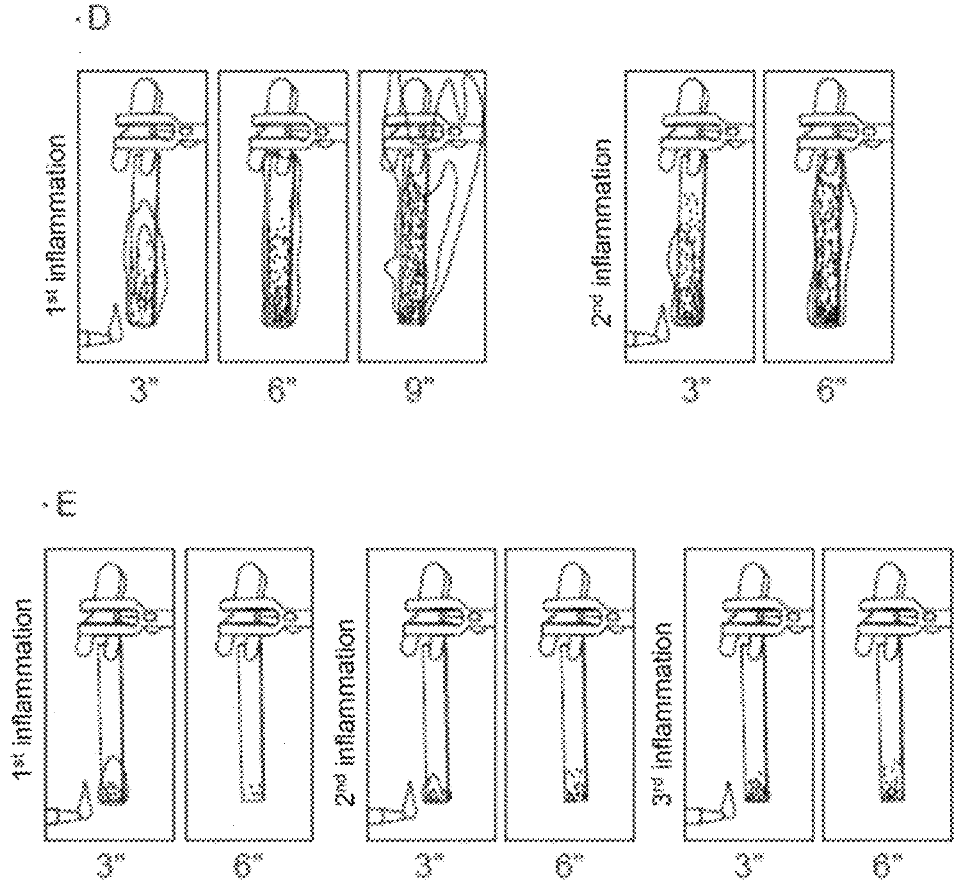
[Fig. 5a]
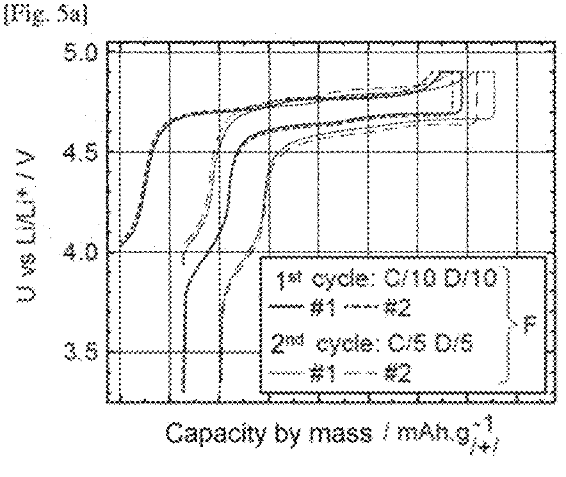

[Fig. 5b]
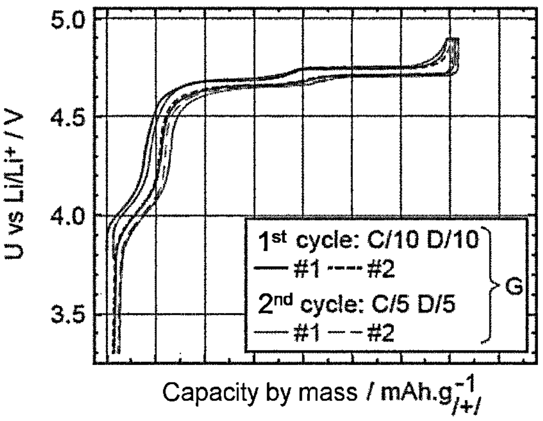
[Fig. 5c]
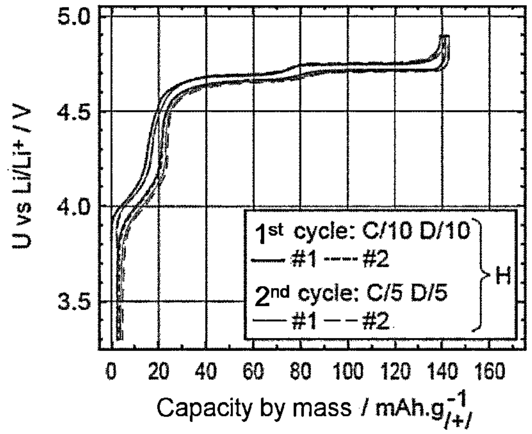
[Fig. 6a]
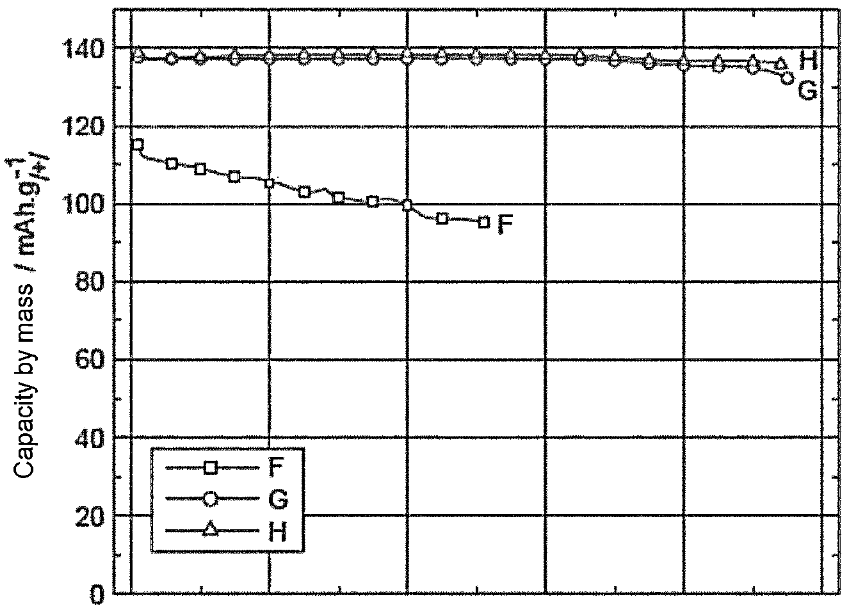

[Fig. 6b]
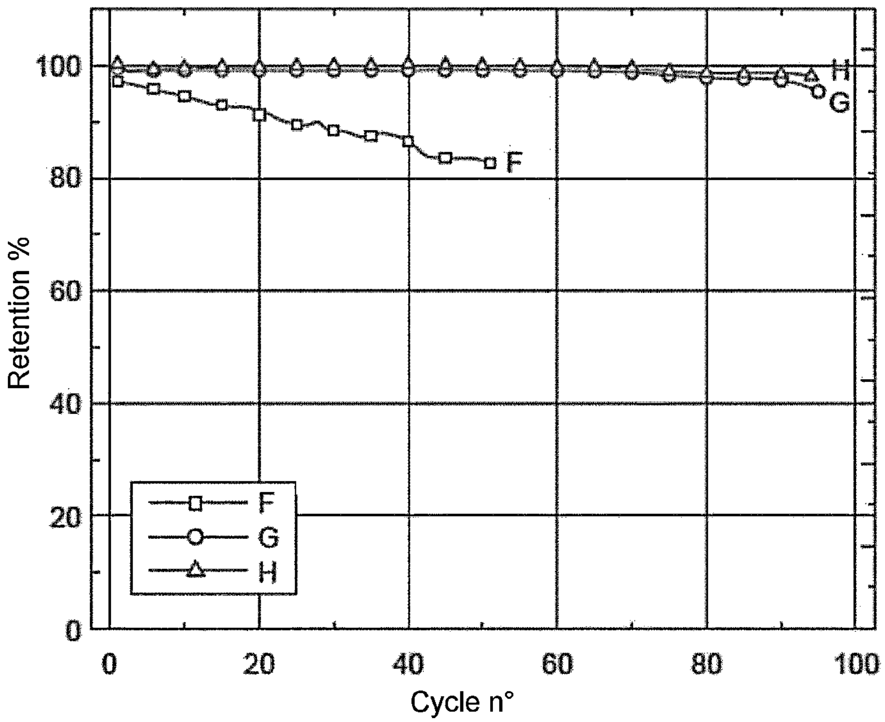
[Fig. 7a]
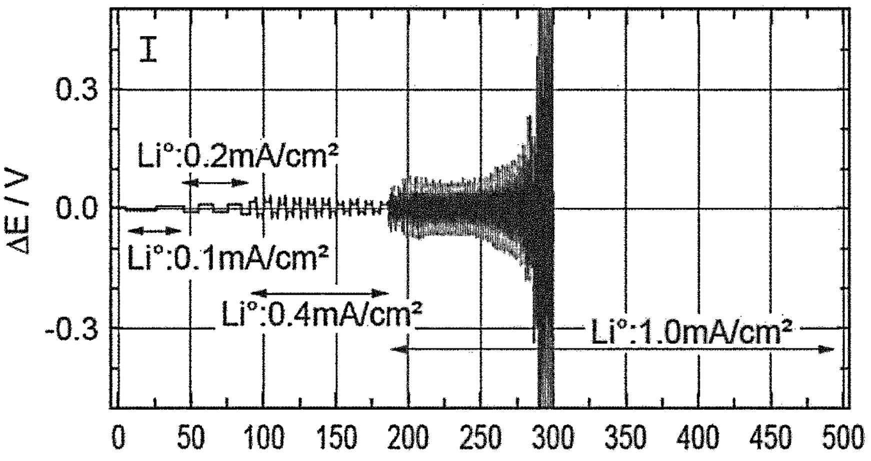

[Fig. 7b]
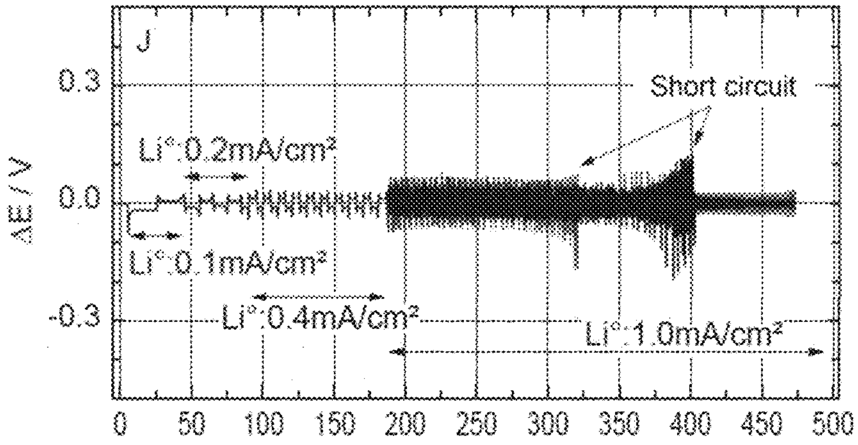
[Fig. 7c]
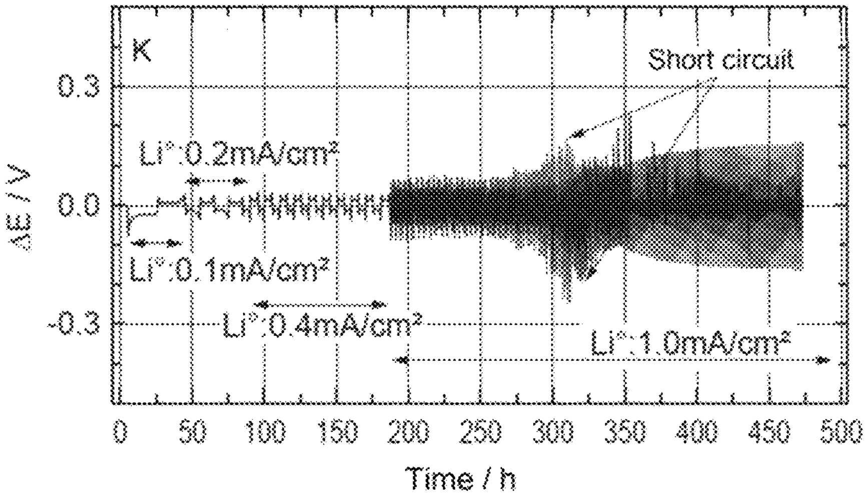

FLUORINATED ELECTROLYTE COMPOSITION FOR AN ELECTROCHEMICAL CELL HAVING A LITHIUM OR LITHIUM ALLOY ANODE

CROSS REFERENCE TO RELATED APPLICATIONS

This application is a National Stage of International Application No. PCT/EP2021/077864 filed Oct. 8, 2021, claiming priority based on French Patent Application No. 2011417 filed Nov. 6, 2020.

TECHNICAL FIELD OF THE INVENTION

The technical field of the invention is that of electrochemical cells comprising a lithium or lithium alloy anode.

BACKGROUND OF THE INVENTION

Rechargeable electrochemical cells of the lithium-ion type are known from the state of the art. They include at least one cathode (positive electrode), the active material of which is generally a lithiated oxide of at least one transition metal or a lithiated phosphate of at least one transition metal, and at least one anode (negative electrode) whose active material may be based on graphite. These cells have satisfactory cyclability. Nevertheless, the capacity of the graphite anode is only about 370 mAh/g, which is modest in comparison with that of a lithium anode which is about 3860 mAh/g, or more than ten times greater than that of graphite. Since lithium is a light, malleable and very capacitive material, the use of a lithium anode constitutes a possible way to increase the capacity of lithium electrochemical cells.

Electrochemical cells including a metallic lithium anode are known from the state of the art. The solvent of their electrolyte is typically a mixture of cyclic or linear carbonates. However, such cells have the major disadvantage of being difficult to be cycled. In fact, lithium dendrites are gradually formed on the surface of the anode during the cycling operation of the cell. These dendrites grow during cycling and can end up piercing the separator of the cell and reaching the cathode, which has the effect of creating a short circuit between the anode and the cathode and causing an irreversible failure of the cell. The use of a thick separator, more resistant to dendrites, does not constitute a satisfactory solution to the problem of dendritic growth because it leads to an increase in the internal resistance of the cell and therefore a drop in the power performance of the cell.

An electrochemical cell including an anode made of metallic lithium or based on a lithium alloy having improved cyclability is therefore sought.

An electrochemical cell is preferably sought comprising an anode made of metallic lithium or based on a lithium alloy which can be used in cycling at a temperature above 25° C. and which can go up to at least 60° C., preferably up to at least 85° C. This purpose is considered to be achieved when the cell is capable of operating under cycling conditions at 60° C. by carrying out at least 25 cycles at a depth of discharge of 100% without a loss of capacity of more than 20% of its initial capacity is observed. It is considered that this objective is achieved when the cell is capable of operating under cycling conditions at 25° C. by carrying out a hundred cycles at a depth of discharge of 100% without a loss of capacity of more than 10% of its initial capacity is observed.

SUMMARY OF THE INVENTION

To this end, the invention relates to an electrochemical cell comprising:

at least one anode comprising metallic lithium or a lithium alloy or at least one anode comprising a current collector at least partially covered with metallic lithium deposited after at least one charge of the cell, the cell not containing metallic lithium at the time of its manufacture, at least one cathode, a liquid or gelled electrolyte composition comprising:

a) a solvent comprising:

i) either a mixture of 1,1,1,3,3,3-hexafluoro-2-methoxypropane (HFMP) and/or 1,1,1,3,3,3-hexafluoro-2-(fluoromethoxy)propane (HFMFP), ethylene monofluorocarbonate (F1EC) and 2,2,2-trifluoroethyl methyl carbonate (F3EMC), ii) or a mixture of 1,1,1,3,3,3-hexafluoro-2-methoxypropane (HFMP) and/or 1,1,1,3,3,3-hexafluoro-2-(fluoromethoxy)propane (HFMFP), ethylene monofluorocarbonate (F1EC) and 2,2,2-trifluoroethyl acetate (F3EA), b) at least one salt whose cation is the lithium cation, c) lithium difluorophosphate $LiPO_2F_2$, and optionally one or more additives selected from the group consisting of a lithium fluorinated phosphate, an alkylated lithium phosphate, the hydrogen atoms of the alkyl group(s) optionally being partially or totally substituted by fluorine, a sulfate optionally partially or totally substituted by fluorine, a sulfonate optionally partially or totally substituted by fluorine, a sulfoxide optionally partially or totally substituted by fluorine, a sulfonate optionally partially or totally substituted by fluorine, a cyclic carbonate comprising at least one unsaturation and a mixture thereof, the amount of lithium difluorophosphate representing from 0.05 to 5% of the mass of the combination made up of the solvent and said at least one dissolved lithium salt, the total amount of lithium difluorophosphate and of the additive(s) representing at most 10% of the mass of the combination made up of the solvent and said at least one dissolved lithium salt.

It was surprisingly discovered that the use of a solvent as defined in variants i) and ii) in combination with lithium difluorophosphate allowed to increase the service life of an electrochemical cell comprising a lithium or lithium alloy anode, when this cell is used under cycling conditions. The cycling can be carried out at a temperature above 25° C., up to at least about 85° C.

It has also been observed that the electrolyte composition according to the invention has advantageous non-flammability properties. The electrochemical cell according to the invention is therefore of interest from the point of view of the safety of the user because it has a lower risk of ignition in the event of the occurrence of an internal short-circuit.

According to one embodiment, the anode comprises metallic lithium or a lithium alloy.

According to one embodiment, the additive is selected from the group consisting of ethylene sulfate ESA, vinyl carbonate VC and a mixture thereof.

According to one embodiment, the mass percentage of $LiPO_2F_2$ of which ranges from 0.05 to 2%, preferably from 0.1 to 1% of the mass of the combination made up of the solvent and said at least one salt.

According to one embodiment, the lithium salt is lithium hexafluorophosphate $LiPF_6$.

According to one embodiment, the solvent is free of non-fluorinated carbonate.

According to one embodiment, the cathode comprises an active cathodic material operating at a potential higher than 4.5 V with respect to the $Li^+/Li$ couple.

According to one embodiment, the cathodic active material has the formula $Li_xMn_{2-y-z}M'_yM'_zO_4$ (LMO), where M' and M" are selected from the group consisting of B, Mg, Al, Si, Ca, Ti, V, Cr, Fe, Co, Ni, Cu, Zn, Y, Zr, Nb and Mo; M' and M" being different from each other, and $1 \leq x \leq 1.4$; $0 \leq y \leq 0.6$; $0 \leq z \leq 0.2$.

According to one embodiment, the cathodic active material has a disordered crystalline structure.

According to one embodiment, the cathode comprises a mixture of two cathodic active materials, the first having a disordered crystalline structure, the second having an ordered crystalline structure.

According to one embodiment, the electrolyte composition comprises:

- a solvent comprising a mixture of 1,1,1,3,3,3-hexafluoro-2-methoxypropane (HFMP) and/or 1,1,1,3,3,3-hexafluoro-2-(fluoromethoxy)propane (HFMFP), ethylene monofluorocarbonate (F1EC) and 2,2,2-trifluoroethyl acetate (F3EA);
- lithium hexafluorophosphate $LiPF_6$ as salt;
- lithium difluorophosphate $LiPO_2F_2$ as an additive.

According to one embodiment, 1,1,1,3,3,3-hexafluoro-2-methoxypropane (HFMP) and/or 1,1,1,3,3,3-hexafluoro-2-(fluoromethoxy)propane (HFMFP) represents 10 to 50% of the volume of solvent or 15 to 40% of the volume of solvent or 20 to 30% of the volume of solvent.

According to one embodiment, 1,1,1,3,3,3-hexafluoro-2-methoxypropane (HFMP) and/or 1,1,1,3,3,3-hexafluoro-2-(fluoromethoxy)propane (HFMFP) represents 20 to 30% of the volume of solvent, ethylene monofluorocarbonate (F1EC) represents 15 to 40% of the volume of solvent and 2,2,2-trifluoroethyl acetate (F3EA) represents 30 to 50% of the volume of solvent.

BRIEF DESCRIPTION OF THE DRAWINGS

FIG. 1 shows the voltage variation of type A, B and C cells during the first formation cycle at 60° C. at the charge and discharge rate of C/20, C being the nominal capacity of the cells. The potential limits are 3.3 and 4.9 V.

FIG. 2*a* shows the variation of the potential between the two lithium electrodes of the type D cells during cycling at a temperature of 60° C. Charge and discharge cycles were performed at rates of 0.1 $mA/cm^2$, 0.2 $mA/cm^2$, 0.4 $mA/cm^2$ and 1.0 $mA/cm^2$.

FIG. 2*b* shows the variation of the potential between the two lithium electrodes of the type E cells during a cycling carried out under the same conditions as those of FIG. 2*a*.

FIG. 3 shows the variation of the specific capacity of type A, B and C cells during a cycling at a temperature of 60° C. at the charge and discharge rate of C/10.

FIG. 4 shows a series of photographs taken on ceramic paper strips impregnated with the electrolytes of the type D (top photographs) and type E (bottom photographs) cells.

FIG. 5*a* shows the variation of the voltage of type F cells during the first two formation cycles at 25° C. The first cycle is carried out at the rate of C/10. The second cycle is carried out at the rate of C/5.

FIG. 5*b* shows the variation of the voltage of the type G cells during the first two formation cycles carried out under the same conditions as those of FIG. 5*a*.

FIG. 5*c* shows the variation of the voltage of the type H cells during the first two formation cycles carried out under the same conditions as those of FIG. 5*a*.

FIG. 6*a* shows the variation of the specific capacity of type F, G and H cells during a cycling at a temperature of 25° C. at the charge and discharge rate of C/5.

FIG. 6*b* shows the variation in the percentage of retention of the capacity of type F, G and H cells during the cycling carried out under the conditions of FIG. 6*a*.

FIG. 7*a* shows the variation of the potential between the two lithium electrodes of the type I cell during cycling at a temperature of 60° C. Charge and discharge cycles were carried out at rates of 0.1 $mA/cm^2$, 0.2 $mA/cm^2$, 0.4 $mA/cm^2$ and 1.0 $mA/cm^2$.

FIG. 7*b* shows the variation of the potential between the two lithium electrodes of the type J cell during cycling carried out under the same conditions as those of FIG. 7*a*.

FIG. 7*c* shows the variation of the potential between the two lithium electrodes of the type K cell during a cycling carried out under the same conditions as those of FIG. 7*a*.

DESCRIPTION OF EMBODIMENTS OF THE INVENTION

The electrolyte composition according to the invention as well as the various constituents of an electrochemical cell comprising the electrolyte composition according to the invention will be described in the following.

Electrolyte Composition

The electrolyte composition comprises a solvent comprising:

- either a mixture i) of 1,1,1,3,3,3-hexafluoro-2-methoxypropane (HFMP) and/or 1,1,1,3,3,3-hexafluoro-2-(fluoromethoxy)propane (HFMFP), ethylene monofluorocarbonate (F1EC) and 2,2,2-trifluoroethyl methyl carbonate (F3EMC),
- either a mixture ii) of 1,1,1,3,3,3-hexafluoro-2-methoxypropane (HFMP) and/or 1,1,1,3,3,3-hexafluoro-2-(fluoromethoxy)propane (HFMFP), ethylene monofluorocarbonate (F1EC) and 2,2,2-trifluoroethyl acetate (F3EA).

The chemical formulas of the various chemical compounds of the solvent are given below.

HFMP: 1,1,1,3,3,3-hexafluoro-2-methoxypropane, further referred to below by the term hexafluoromethoxypropane.

[Chem 1]

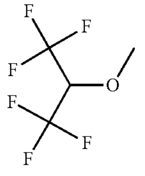

HFMFP: 1,1,1,3,3,3-hexafluoro-2-(fluoromethoxy)propane, further referred to below by the term hexafluoro (fluoromethoxy)propane.

[Chem 2]

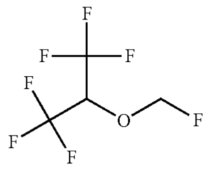

F1EC: ethylene monofluorocarbonate or 4-fluoro-1,3-dioxolan-2-one

[Chem 3]

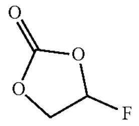

F3EMC: 2,2,2-trifluoroethyl methyl carbonate, further referred to below by the term trifluoroethyl methyl carbonate

[Chem 4]

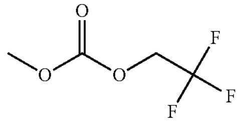

F3EA: 2,2,2-trifluoroethyl acetate, further referred to below by the term trifluoroethyl acetate

[Chem 5]

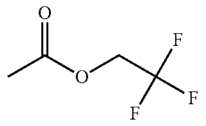

The use of hexafluoromethoxypropane (HFMP) and/or hexafluoro(fluoromethoxy) propane (HFMFP) in combination with:

either a mixture i) of ethylene monofluorocarbonate (F1 EC) and methyl trifluoroethyl carbonate (F3EMC), or a mixture ii) of ethylene monofluorocarbonate (F1EC) and trifluoroethyl acetate (F3EA), improves the service life of the cell.

Hexafluoromethoxypropane (HFMP) and/or hexafluoro (fluoromethoxy)propane (HFMFP) can represent 10 to 50% of the volume of solvent or 15 to 40% of the volume of solvent or 20 to 30% of the volume of solvent.

In the case of mixture i), the sum of the volume percentages of hexa-fluoromethoxypropane (HFMP) and/or hexafluoro(fluoromethoxy)propane (HFMFP) and trifluoroethyl methyl carbonate (F3EMC) expressed in relation to the volume of solvent may be greater than or equal to 50% or greater than or equal to 60% or greater than or equal to 70%. Hexafluoromethoxypropane (HFMP) and/or hexafluoro (fluoromethoxy)propane (HFMFP) can represent from 20 to 30% of the volume of solvent. Ethylene monofluorocarbonate (F1EC) can represent 15 to 40% of the volume of solvent. Trifluoroethyl methyl carbonate (F3EMC) can represent 30 to 50% of the volume of solvent.

In the case of mixture ii), the sum of the volume percentages of hexa-fluoromethoxypropane (HFMP) and/or hexafluoro(fluoromethoxy)propane (HFMFP) and trifluoroethyl acetate (F3EA) expressed with respect to the volume of solvent may be greater than or equal to 50% or greater than or equal to 60% or greater than or equal to 70%. Hexafluoromethoxypropane (HFMP) and/or hexafluoro (fluoromethoxy)propane (HFMFP) can represent 20 to 30% of the volume of solvent. Ethylene monofluorocarbonate (F1EC) can represent 15 to 40% of the volume of solvent. Trifluoroethyl acetate (F3EA) can represent 30 to 50% of the volume of solvent.

In a preferred embodiment, hexafluoromethoxypropane (HFMP) and/or hexafluoro(fluoromethoxy)propane (HFMFP) is associated with ethylene monofluororocarbonate (F1EC) and trifluoroethyl acetate (F3EA) (mixture ii). It has in fact been discovered that trifluoroethyl acetate allows to avoid the decomposition of the electrolyte into a gas product and therefore the increase in the internal pressure of the cell. Without wishing to be bound by theory, the Applicant is of the opinion that the presence of trifluoroethyl acetate allows to reduce the number of molecules of ethylene monofluorocarbonate (F1EC) which solvate a lithium ion. By reducing the number of molecules of ethylene monofluorocarbonate F1EC around a lithium ion, the amount of carbon dioxide generated would be reduced and the risk of the container of the cell being opened would be reduced.

The solvent can consist only of the chemical compounds of mixture i) or consist only of the chemical compounds of mixture ii).

The solvent may not contain:

any other cyclic carbonate than ethylene monofluorocarbonate (F1EC), or any linear carbonate other than methyl trifluoroethyl carbonate (F3EMC), or any ester other than trifluoroethyl acetate (F3EA), or any ether other than hexafluoromethoxypropane (HFMP) and/or hexafluoro(fluoromethoxy)propane (HFMFP).

According to one embodiment, the solvent is free of non-fluorinated carbonates.

According to one embodiment, the solvent is free of non-fluorinated chemical compounds.

The electrolyte composition comprises at least one lithium salt. The lithium salt can be selected from lithium hexafluorophosphate $LiPF_6$, lithium tetrafluoroborate $LiBF_4$, lithium perchlorate $LiClO_4$, lithium hexafluoroarsenate $LiAsF_6$, lithium hexafluoroantimonate $LiSbF_6$, lithium trifluoromethanesulfonate $LiCF_3SO_3$, lithium bis(fluorosulfonyl)imide $Li(FSO_2)_2N$ (LiFSI), lithium trifluoromethanesulfonimide $LiN(CF_3SO_2)_2$ (LiTFSI), lithium trifluoromethanesulfonemethide $LiC(CF_3SO_2)_3$ (LiTFSM), lithium bisperfluoroethylsulfonimide $LiN(C_2F_5SO_2)_2$ (LiBETI), lithium 4,5-dicyano-2-(trifluoromethyl) imidazolide (LiTDI), lithium bis(oxalatoborate) (LiBOB), lithium difluoro(oxalato)borate (LiDFOB), lithium tris(pentafluoroethyl)trifluorophosphate $LiPF_3(CF_2CF_3)_3$ (LiFAP) and mixtures thereof. Preferably, lithium hexafluorophosphate $LiPF_6$ will be selected.

The concentration of said at least one salt in the electrolyte varies from 0.7 to 4 $mol \cdot L^{-1}$, or from 1 to 2 $mol \cdot L^{-1}$, or from 1.2 to 2 $mol \cdot L^{-1}$.

The Applicant has observed that the addition of lithium difluorophosphate $LiPO_2F_2$ of formula:

[Chem 6]

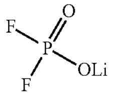

to mixtures i) and ii) allowed, in addition to prolonging the service life of the cell, to avoid the increase in the internal pressure of the cell, and therefore the risk of the container opening.

The mass percentage of lithium difluorophosphate $LiPO_2F_2$ ranges from 0.05 to 5%, preferably from 0.05 to 2%, more preferably from 0.1 to 1% of the mass of the combination made up of the solvent and said at least one salt.

Optionally, $LiPO_2F_2$ is combined with one or more additives selected from the group consisting of a lithium fluorinated phosphate, a lithium alkyl phosphate, the hydrogen atoms of the alkyl group(s) optionally being partially or totally substituted by fluorine, a sulfate optionally partially or totally substituted by fluorine, a sulfonate optionally partially or totally substituted by fluorine, a sulfoxide optionally partially or totally substituted by fluorine, a sulfone optionally partially or totally substituted by fluorine, a cyclic carbonate including at least one unsaturation and a mixture thereof. $LiPO_2F_2$ can for example be associated with ethylene sulfate ESA whose formula is:

[Chem 7]

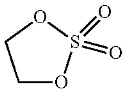

The total amount of lithium difluorophosphate and of the additive(s) represents at most 10% of the mass of the combination made up of the solvent and said at least one dissolved lithium salt.

Without wishing to be bound by theory, the Applicant is of the opinion that the presence of lithium difluorophosphate $LiPO_2F_2$ would allow to limit the reactivity of the ethylene monofluorocarbonate (F1EC) contained in the mixtures i) and ii) with respect to the anode. By limiting the reactivity of ethylene monofluorocarbonate (F1EC) with respect to the anode, the growth of the SEI passivation layer on the surface of the anode would be limited. A passivation layer that is too thick leads to a significant rise in the temperature of the cell during its first charge (also called “formation”). This phenomenon is detrimental to the service life of the cell.

Although the presence of trifluoroethyl acetate (F3EA) or lithium difluorophosphate $LiPO_2F_2$ allows in both cases to reduce heating of the cell, it seems that the action mechanisms of these two chemical compounds are different. Trifluoroethyl acetate (F3EA) would act by reducing the solvation number of ethylene monofluorocarbonate (F1EC) around a lithium ion. The lithium difluorophosphate $LiPO_2F_2$ would rather act by preventing the molecules of ethylene monofluorocarbonate F1EC from forming a passivation layer (SEI) at the anode that is too thick.

The Applicant is of the opinion that by acting on the solvation number of F1EC and/or on the thickness of the passivation layer, it is possible to obtain both a good service life of the cell in cycling and low gas emission in the cell container.

A particularly preferred electrolyte composition comprises:

a) a solvent comprising or consisting of a mixture of hexafluoromethoxypropane (HFMP) and/or hexafluoro (fluoromethoxy)propane (HFMFP), ethylene monofluorocarbonate (F1EC) and trifluoroethyl acetate (F3EA), b) $LiPF_6$ in a concentration ranging from 0.7 to 2 $mol \cdot L^{-1}$, preferably between 1 and 1.5 $mol \cdot L^{-1}$;

c) $LiPO_2F_2$ in a mass percentage ranging from 0.05 to 5%, preferably from 0.05 to 2%, more preferably from 0.1 to 1% of the mass of the combination made up by the solvent and $LiPF_6$.

This composition combines an action on the solvation number of F1EC by the presence of F3EA and an action on the thickness of the passivation layer by the presence of $LiPO_2F_2$.

In one embodiment, the electrolyte composition contains lithium hexafluorophosphate ($LiPF_6$), lithium bis(fluorosulfonyl)imide $Li(FSO_2)_2N$ (LiFSI), and lithium difluorophosphate ($LiPO_2F_2$).

The invention also includes the case of gelled electrolytes. To manufacture the gelled electrolyte, the gelling polymer is incorporated into the electrolyte composition. The mixture is stirred for several minutes. It can be heated to a temperature not exceeding in order to accelerate the swelling of the polymer. The gelling polymer can be selected from polyvinylidene fluoride (PVDF), poly(vinylidene fluoride-co-hexafluoropropylene) (PVDF-HFP), a poly(ethylene oxide) or a polyacrylate PVDF and PVDF-HFP are the preferred gelling polymers.

Cathodic Active Material

The cathodic active material is not particularly limited. It is preferably an active material operating at a potential greater than 4.5 V with respect to the $Li^+/Li$ couple. This characteristic is an intrinsic characteristic of the active material. It can easily be measured by routine tests for a person skilled in the art. For this purpose, the person skilled in the art produces an electrochemical cell comprising a first electrode consisting of metallic lithium and a second electrode comprising the active material whose potential is to be determined with respect to the electrochemical couple $Li^+/Li$. These two electrodes are separated by a microporous polyolefin membrane, typically polyethylene, and/or polypropylene impregnated with electrolyte, usually a mixture of ethylene carbonate and dimethyl carbonate, in which is dissolved $LiPF_6$ at a concentration of 1 $mol \cdot L^{-1}$. The potential measurement is carried out at 25° C. Active materials having an operating potential greater than 4.5 V compared to the potential of the electrochemical couple $Li^+/Li$ are also described in the literature.

The active material can be selected from the group consisting of:

a compound i) of formula $Li_xMn_{1-y-z}M'_yM''_zPO_4$ (LMP), where M' and M'' are different from each other and are selected from the group consisting of B, Mg, Al, Si, Ca, Ti, V, Cr, Fe, Co, Ni, Cu, Zn, Y, Zr, Nb and Mo, with $0.8 \leq x \leq 1.2$; $0 \leq y \leq 0.6$;

a compound ii) of formula $Li_xM_{2-x-y-z-w}M'_yM''_zM'''_wO_2$ ($LMO_2$), where M, M', M'' and M''' are selected from the group consisting of B, Mg, Al, Si, Ca, Ti, V, Cr, Mn, Fe, Co, Ni, Cu, Zn, Y, Zr, Nb, W, Mo, Sr, Ce, Ga and Ta, provided that M or M' or M'' or M''' is selected from Mn, Co, Ni, or Fe; M, M', M'' and M''' being different from each other, with $0.8 \leq x \leq 1.4$; $0 \leq y \leq 0.5$; $0 \leq z \leq 0.5$; $0 \leq w \leq 0.2$ and $x+y+z+w<2.2$;

a compound iii) of formula $Li_xMn_{2-y-z}M'_yM''_zO_4$ (LMO), where M' and M" are selected from the group consisting of B, Mg, Al, Si, Ca, Ti, V, Cr, Fe, Co, Ni, Cu, Zn, Y, Zr, Nb and Mo; M' and M" being different from each other, and $1 \leq x \leq 1.4$; $0 \leq y \leq 0.6 \leq 0 \leq z \leq 0.2$;

a compound iv) of formula $Li_xFe_{1-y}M_yPO_4$, where M is selected from the group consisting of B, Mg, Al, Si, Ca, Ti, V, Cr, Mn, Co, Ni, Cu, Zn, Y, Zr, Nb and Mo; and $0.8 \leq x \leq 1.2$; $0 \leq y \leq 0.6$;

a compound v) of formula $xLi_2MnO_3$; $(1-x)LiMO_2$ where M is selected from Ni, Co and Mn and $x \leq 1$.

a compound vi) which is a lithium vanadium fluorophosphate of formula $Li_{1+x}VPO_4F$ where $0 \leq x \leq 0.15$, or one of its derivatives of formula $Li_{1+x}V_{1-y}M_yPO_4F_z$ where $0 \leq x \leq 0.15$; $0 \leq y \leq 0.5$; $0.8 \leq z \leq 1.2$ and M is selected from the group consisting of Ti, Al, Y, Cr, Cu, Mg, Mn, Fe, Co, Ni, and Zr. Examples of preferred derivatives are $LiY_xV_{1-x}PO_4F$ ($0 \leq x \leq 0.5$), $LiCr_xV_{1-x}PO_4F$ ($0 \leq x \leq 0.5$), $LiCo_xV_{1-x}PO_4F$ ($0 \leq x \leq 0.5$), $LiMn_xV_{1-x}PO_4F$ ($0 \leq x \leq 0.5$), $LiTi_xV_{1-x}PO_4F$ ($0 \leq x \leq 0.5$), $LiFe_xV_{1-x}PO_4F$ ($0 \leq x \leq 0.5$); or a mixture of compounds i) to vi).

An example of compound i) is $LiMn_{1-y}Fe_yPO_4$. A preferred example is $LiMnPO_4$. Compound ii) may have the formula $Li_xM_{2-x-y-z-w}M'_yM''_zM'''_wO_2$, where $1 \leq x \leq 1.15$; M denotes Ni; M' denotes Mn; M" denotes Co and M'" is selected from the group consisting of B, Mg, Al, Si, Ca, Ti, V, Cr, Fe, Cu, Zn, Y, Zr, Nb, Mo, Sr, Ce, Ga and Ta or a mixture thereof; $2-x-y-z-w>0$; $y>0$; $z>0$; $w>0$.

Compound ii) may have the formula $LiNi_{1/3}Mn_{1/3}CO_{1/3}O_2$.

Compound ii) may also have the formula $Li_xM_{2-x-y-z-w}M'_yM''_zM'''_wO_2$, where $1 \leq x \leq 1.15$;

M denotes Ni; M' denotes Co; M" denotes Al and M'" is selected from the group consisting of B, Mg, Si, Ca, Ti, V, Cr, Fe, Cu, Zn, Y, Zr, Nb, Mo, Sr, Ce, Ga and Ta or a mixture thereof; $2-x-y-z-w>0$; $y>0$; $z>0$; $w>0$. Preferably, $x=1$; $0.6 \leq 2-x-y-z \leq 0.85$; $0.10 \leq y \leq 0.25$; $0.05 \leq z \leq 0.15$ and $w=0$.

Compound ii) may also be selected from $LiNiO_2$, $LiCoO_2$, $LiMnO_2$, Ni, Co and Mn which may be substituted by one or more of the cells selected from the group comprising Mg, Mn (except for $LiMnO_2$), Al, B, Ti, V, Si, Cr, Fe, Cu, Zn, Zr.

An example of compound iii) is $LiMn_2O_4$. Another example of compound has the formula $Li_xMn_{2-y-z}Ni_yM''_zO_4$ (LMO), where M" is selected from the group consisting of B, Mg, Al, Si, Ca, Ti, V, Cr, Fe, Co, Cu, Zn, Y, Zr, Nb and Mo; and $1 \leq x \leq 1.4$; $0 \leq z \leq 0.2$. An example of this compound is $LiMn_{2-y}Ni_yO_4$ where $0 \leq y \leq 0.6$, such as $LiMn_{1.5}Ni_{0.5}O4$.

An example of compound iv) is $LiFePO_4$.

An example of compound v) is $Li_2MnO_3$.

The compounds of formula $Li_xMn_{2-y-z}M'_yM''_zO_4$ (LMO) described above can have an ordered or disordered crystalline structure. The disordered structure can be obtained by subjecting the compound to annealing. The exposure to heat allows a reorganization of the orientation of the crystalline planes. The annealing is preferably carried out at a temperature greater than or equal to 700° C. The choice of temperature and the duration of the annealing are within the reach of the person skilled in the art. Obtaining the disordered crystalline structure can be verified using Raman spectroscopy or using infrared spectroscopy or by tracing the X-ray diffraction spectrum of the compound.

The applicant observed that an ordered crystal structure favored good cell service life but conferred modest power to the cell. And conversely observed that a disordered crystal structure favored good cell power but conferred a modest service life. The use of an active material having a disordered structure is therefore well suited to the manufacture of "power" type cells, that is to say for which power performance is favored without necessarily setting criteria as to the minimum amount of energy stored by the cell. A compromise in terms of power and service life can be obtained by using a mixture of a first active material having an ordered crystalline structure with a second active material having a disordered crystalline structure. The second active ingredient and the first active ingredient may have identical or different chemical formulas.

The cathodic active material may be at least partially covered by a layer of carbon.

Cathode Binder

The cathodic active material is generally mixed with one or more binder(s), the function of which is to bind the particles of active material together as well as to bind them to the current collector on which they are deposited.

The binder can be selected from carboxymethylcellulose (CMC), a copolymer of butadiene-styrene (SBR), polytetrafluoroethylene (PTFE), polyamideimide (PAI), polyimide (PI), styrene-butadiene rubber (SBR), polyvinyl alcohol, polyvinylidene fluoride (PVDF), poly(vinylidene fluoride-co-hexafluoropropylene) (PVDF-HFP), acrylonitrile-butadiene rubber (NBR) and hydrogenated acrylonitrile-butadiene rubber (HNBR) and a mixture thereof.

Cathode Current Collector

The cathode current collector is in the form of a solid or perforated metal sheet. The sheet can be made from different materials. Mention may be made of copper or copper alloys, aluminum or aluminum alloys, nickel or nickel alloys, and stainless steel.

The cathode current collector is generally an aluminum sheet or an alloy mainly comprising aluminum. The cathode sheet has a thickness generally comprised between 6 and 30 μm.

According to a preferred embodiment, the aluminum collector of the cathode is covered with a conductive coating, such as carbon black, graphite.

Manufacture of the Cathode

The cathodic active material is mixed with one or more binders mentioned above and optionally a good electronic conductor compound, such as carbon black. An ink is obtained which is deposited on one or both faces of the current collector. The current collector coated with ink is rolled in order to adjust its thickness. A cathode is thus obtained.

The composition of the ink deposited on the cathode can be as follows:

- from 75 to 96% of cathodic active material, preferably from 80 to 90%;
- from 2 to 15% of binder(s), preferably 10%;
- from 2 to 10% of electronically conductive compound, preferably 10%.

Manufacture of the Anode

The anodic active material is metallic lithium or a lithium-based alloy of formula LiM, where M is selected from the group consisting of Mg, Al, Si, B, Ge, Ga or a mixture thereof. Preferably, M is Al. The anodic active material can be in the form of a strip of lithium or a strip of lithium alloy on which a current collector is fixed. The current collector can be solid or have an openwork structure. The current collector can be selected from the group comprising a perforated metal, a metal, a grid, a metal fabric and is made of a material selected from copper, stainless steel and nickel, preferably copper. The active material can be fixed to the current collector by a rolling method. Instead of being brought into the cell in the form of a strip of lithium or a strip of a lithium alloy during the manufacture of the cell, metallic lithium can also be formed on a current collector during the charge of this cell, generally from the first charge of the cell. The current collector is made of a metal other than lithium, for example copper. During the charge of the cell, the cathode generates lithium ions which are reduced to the anode and are deposited thereon. The metallic lithium deposited at the anode is consumed during the next discharge. The invention therefore applies to the field of cells called lithium-free cells. The term “lithium free” defines the fact that the cell does not contain metallic lithium at the time of its manufacture, but that lithium is deposited in metallic form then consumed in a controlled and reversible manner in situ during the operation of the cell.

Separator

The material of the separator can be selected from the following materials: a polyolefin, for example polypropylene, polyethylene, a polyester, glass fibers bonded together by a polymer, polyimide, polyamide, polyaramide, polyamideimide and cellulose. The polyester can be selected from polyethylene terephthalate (PET) and polybutylene terephthalate (PBT). Advantageously, the polyester or polypropylene or polyethylene contains or is coated with a material selected from the group consisting of a metal oxide, a carbide, a nitride, a boride, a silicide and a sulfide. This material can be $SiO_2$ or $Al_2O_3$.

Preparation of the Cell

An electrochemical bundle is formed by inserting a separator between at least one cathode and at least one anode. The electrochemical bundle is inserted into the container of the cell. The container of the cell can be of parallelepipedal, cylindrical or pouch format.

The electrochemical bundle can be formed by stacking electrodes and separators and be in the form of a parallelepiped. The format of the container in this case is parallelepipedic (prismatic).

The electrochemical bundle may also consist of a spiral winding of at least one cathode and at least one anode separated by a separator. The format of the container in this case is cylindrical.

The container is sealed with a lid. The lid is provided with an opening for the introduction of the electrolyte when it is liquid. The composition of liquid electrolyte is introduced into the container of the cell through a vacuum created in the container by an operator.

A pouch-like cell is obtained by forming a set of plates obtained by stacking at least one cathode and at least one anode separated by a separator. The set of plates is housed in a flexible envelope (or pouch) formed after welding the edges of two multi-layer films, each multi-layer film comprising a metal layer, generally aluminum, sandwiched between two layers of plastic material. The envelope thus formed is filled with electrolyte then closed in a sealed manner.

EXAMPLES

Different types of electrochemical cells referenced A to K have been manufactured. Type A-C and F-H cells comprise an anode made of metallic lithium $Li^{(0)}$ and a cathode whose active material has the formula $LiNi_{0.5}Mn_{1.5}O_4$. Type D-E and I-J-K cells are symmetrical cells including an anode and a cathode made of metallic lithium. The composition of the electrolytes used is indicated in Table 1 below. The separator is a three-layer PP/PE/PP (PP: polypropylene; PE: polyethylene) separator.

TABLE 1

| Cell type | Cathodic active material | Anodic active material | Solvent | $LiPF_6$ (mol. $L^{-1}$) | $LiPO_2F_2$ (%)*** | VC (%)*** |
|---|---|---|---|---|---|---|
| A* | mixture of ordered | $Li^{(0)}$ | EC:PC:EMC:DMC 10:20:25:45 | 1.0 | — | 3 |
| B* | $LiNi_{0.5}Mn_{1.5}O_4$ and disordered | | FIEC: F3EA: HFMP 30: 45: 25 | 1.2 | — | — |
| C | $LiNi_{0.5}Mn_{1.5}O_4$ | | FIEC: F3EA: HFMP 30: 45: 25 | 1.2 | 0.1 | — |
| D* | $Li^{(0)}$ | $Li^{(0)}$ | EC: EMC 30: 70 | 1.0 | — | — |
| E* | | | FIEC: F3EA: HFMP 30: 45: 25 | 1.2 | — | — |
| F* | disordered $LiNi_{0.5}Mn_{1.5}O_4$ | $Li^{(0)}$ | EC:PC:EMC:DMC 10:20:25:45 | 1.2 | — | 3 |
| G | | | FIEC: F3EA: HFMP 30: 45: 25 | 1.2 | 0.3 | — |
| H | | | FIEC: F3EA: HFMFP 30: 45: 25 | 1.2 | 0.3 | — |
| I* | $Li^{(0)}$ | $Li^{(0)}$ | EC:PC:EMC:DMC 10:20:25:45 | 1.0 | — | 3 |

TABLE 1-continued

| Cell type | Cathodic active material | Anodic active material | Solvent | $LiPF_6$ (mol. $L^{-1}$) | $LiPO_2F_2$ (%)*** | VC (%)*** |
|---|---|---|---|---|---|---|
| J | | | FIEC: F3EA: HFMP 30: 45: 25 | 1.2 | 0.3 | — |
| K | | | FIEC: F3EA: HFMFP 30: 45: 25 | 1.2 | 0.3 | — |

*Cell not forming part of the invention
**Volume ratios
***Percentage by mass expressed in relation to the sum of the mass of the solvent and the mass of $LiPF_6$
EC: ethylene carbonate
PC: propylene carbonate
EMC: ethyl methyl carbonate
DMC: dimethyl carbonate a) Effect of the replacement of the non-fluorinated carbonates of the electrolyte by a fluorinated ternary mixture according to the invention on the service life of the cell:

a-1) Type A, B and C cells have undergone a first "formation" cycle at 60° C. The charge consists of a first step of charging at constant current of C/20 up to a voltage of 4.9 V followed by a second step of charging at a constant voltage of 4.9 V and stopping the charge either when the charging current falls below C/200, that is to say when the time required for the charging current to fall below C/200 exceeds 1 hour. The discharge is carried out at the C/20 rate down to a cut-off voltage of 3.3 V. The high maximum voltage of 4.9 V as well as the high temperature of 60° C. place the cells under severe cycling conditions. In addition, the long charge and discharge times expose the electrolyte to high potentials (4.7 V) over a prolonged period. These conditions allow to simulate accelerated aging of the electrodes. FIG. 1 shows the voltage variation of cells A, B and C during the first formation cycle. Two cells per type A, B and C were tested.

Type A cells comprising a mixture of non-fluorinated carbonates serve as a reference. By comparing the voltage curves of type B and C cells with those of type A cells, the following improvements are observed:

- the irreversible capacity by mass is reduced. It goes from 95 mAh/g to 18 mAh/g that is to say a reduction of 81%;
- the polarization of the cell, that is to say the difference between the voltage in charge and the voltage in discharge of the cell for a given state of charge, is reduced;
- the time during which the cell voltage is maintained at 4.9 V (floating time) is reduced. This results in lower oxidation of the electrolyte.

These various improvements can be attributed to the replacement of the non-fluorinated carbonates by the fluorinated ternary mixture F1EC: F3EA: HFMP. It is also noted that the "floating" duration is shorter for type C cells than for type B cells. This advantage can be attributed to the presence of $LiPO_2F_2$ in the electrolyte.

a-2) The symmetrical type D and E cells were subjected to cycling at 60° C. comprising the following steps:

- 1 cycle at the rate of 0.1 $mA/cm^2$
- 2 cycles at the rate of 0.2 $mA/cm^2$
- 10 cycles at the rate of 0.4 $mA/cm^2$
- cycles at the rate of 1.0 $mA/cm^2$ until a failure of the cell is observed.

The voltage variation during cycling is measured.

FIG. 2*a* shows significant voltage variations from 200 hours of cycling. This testifies to a significant increase in the resistance at the interfaces of the two electrodes. Extraction and insertion of lithium is less easy, leading to an increase in resistance. Poor lithium passivation of the electrodes of type D cells can explain the poor extraction/insertion of lithium.

In contrast, failure of type E cells only occurs from the $450^{th}$ and the $500^{th}$ hour. The service life of type E cells is therefore doubled compared to that of type D cells. These tests confirm the benefit obtained by replacing the non-fluorinated carbonates EC and EMC with the fluorinated ternary mixture F1EC: F3EA: HFMP.

a-3) After formation, the type A, B and C cells underwent cycling at a temperature of 60° C. at a rate of C/10. Each charge consists of a first step of charging at constant current of C/10 up to a voltage of 4.9 V followed by a second step of charging at constant voltage of 4.9 V and stopping the charge either when the charging current becomes less than C/100, or when the time required for the charging current to become less than C/100 exceeds 1 h. FIG. 3 shows the variation of the capacity by mass of the type A, B and C cells during this cycling. It can be seen that the fastest decrease in capacity by mass is obtained with type A cells. The performance of type B and C cells is maintained further during cycling. The loss of capacity after 25 cycles is approximately 15% for type B and C cells, whereas it is approximately 30% for type A cells. It is further noted that globally over the whole of the cycling, the capacity by mass of type C cells is higher than that of type B cells, which itself is higher than that of type A cells. Finally, it can be noted that the addition of only 0.1% of $LiPO_2F_2$ in type C cells is sufficient to observe a significant improvement in the capacity by mass and the service life of the cell.

b) Effect of the replacement of the non-fluorinated carbonates of the electrolyte by a fluorinated ternary mixture according to the invention on the resistance to ignition of the electrolyte:

Strips of ceramic paper were impregnated with the electrolyte of the type D and E cells then were ignited. Photographs of the appearance of the strips were taken at three seconds, six seconds and nine seconds after igniting them. This test allows to evaluate the flammable character of the electrolyte compositions because the ceramic paper alone is fireproof. The photographs in the top row corresponding to an EC:EMC electrolyte show inflammation of the strip. The photographs of the bottom row corresponding to a ternary electrolyte F1EC: F3EA: HFMP show an extinction of the flame six seconds after having ignited the strip. This test demonstrates the non-flammable nature of the fluorinated ternary composition.

c) Influence of the crystallographic structure (ordered/disordered state) and of the replacement of HFMP by HFMFP on the service life and the polarization of the cell:

c-1) Type F, G and H cells whose cathodic active material consists of disordered $LiNi_{0.5}Mn_{1.5}O_4$ have been prepared. They underwent two "formation" cycles at a temperature of 25° C. During the first cycle, the charge consists of a first step of charging at constant current of C/10 up to a voltage of 4.9 V followed by a second step of charging at constant voltage of 4.9 V and stopping the charge either when the charging current becomes less than C/100, or when the time required for the charging current to become less than C/100 exceeds 1 h. The discharge is carried out at the rate of C/10 up to a cut-off voltage of 3.3 V. The charge and discharge of the $2^{nd}$ cycle differs from those of the Pt cycle in that the rate is C/5 instead of C/10. FIGS. 5a, 5b and 5c represent the variations in the voltage of the cells F, G and H during these two formation cycles. Two cells per type F, G and H were tested.

Type F cells comprising a mixture of non-fluorinated carbonates serve as a reference. By comparing the voltage curves of the type G and H cells with those of type F, the same findings as those of the tests in FIG. 1 are reached, that is to say a reduction in the irreversible capacity by mass, a reduction in polarization and a reduction in the time during which the cell is exposed to high voltage. The benefit observed for type C and G cells whose electrolyte contains HFMP is also observed for type H cells whose electrolyte contains HFMFP. The applicant is also of the opinion that the use of disordered $LiNi_{0.5}Mn_{1.5}O_4$ allows to reduce the polarization of the cell in comparison with a cell whose cathode would contain ordered $LiNi_{0.5}Mn_{1.5}O_4$. The use of disordered $LiNi_{0.5}Mn_{1.5}O_4$ is therefore well suited to the manufacture of "power" type cells, that is to say for which power performance is preferred without necessarily setting a criterion on the amount of energy stored by the cell. The "power" type cells are in fact generally characterized by a low internal resistance.

c-2) Type F, G and H cells underwent cycling at a temperature of 25° C. at the rate of C/5. The step of charging at constant voltage of 4.9 V is stopped when the floating time exceeds 30 minutes. The cycling results are shown in FIGS. 6a and 6b. It can be seen on the one hand in FIG. 6a that the replacement of the carbonates by the fluorinated solvent according to the invention allows to very significantly reduce the loss of cycling capacity. Indeed, the mass capacitance of the type G and H cells has practically not decreased after 50 cycles, whereas that of the F cell has decreased by approximately 20% after 50 cycles. It is further observed that from the start of cycling, the value of the capacity by mass of the type G and H cells is greater than that of the type F cells by about 30 mAh/g. The performances obtained on the type G cells are similar to those obtained on the type H cells, which indicates that HFMP and HFMFP are equivalent from the point of view of performance in a $LiNi_{0.5}Mn_{1.5}O_4/Li^{(0)}$ type cell. The same conclusions can be drawn from FIG. 6b which represents the percentage of capacity retention of the cells compared to their capacity at the start of cycling as a function of the number of cycles.

c-3) The type I, J and K symmetrical cells were subjected to cycling at 60° C. comprising the following steps:

1 cycle at the rate of 0.1 $mA/cm^2$ 2 cycles at the rate of 0.2 $mA/cm^2$ 10 cycles at the rate of 0.4 $mA/cm^2$ cycles at the rate of 1.0 $mA/cm^2$ until a failure of the cell is observed.

The voltage variation during cycling is measured.

FIG. 7a shows a failure of the cell I after 300 hours of cycling. On the other hand, the failure of type J and K cells only occurs after that of cell I. These tests confirm the benefit obtained thanks to the replacement of the non-fluorinated carbonates EC and EMC by the fluorinated ternary mixture F1EC:F3EA: HFMFP.

The invention claimed is:

1. An electrochemical cell comprising:

at least one anode comprising metallic lithium or a lithium alloy or at least one anode comprising a current collector at least partially covered with metallic lithium deposited after at least one charge of the cell, the cell not containing metallic lithium at the time of its manufacture, at least one cathode, a liquid or gelled electrolyte composition comprising:

a) a solvent comprising a mixture of 1,1,1,3,3,3-hexafluoro-2-methoxypropane (HFMP) and/or 1,1,1,3,3,3-hexafluoro-2-(fluoromethoxy) propane (HFMFP), ethylene monofluorocarbonate (F1EC) and 2,2,2-trifluoroethyl acetate (F3EA), b) at least one salt whose cation is the lithium cation, c) lithium difluorophosphate $LiPO_2F_2$, and optionally one or more additives selected from the group consisting of a lithium fluorinated phosphate, an alkylated lithium phosphate, the hydrogen atoms of the alkyl group(s) optionally being partially or totally substituted by fluorine, a sulfate optionally partially or totally substituted by fluorine, a sulfonate optionally partially or totally substituted by fluorine, a sulfoxide optionally partially or totally substituted by fluorine, a sulfone optionally partially or totally substituted by fluorine, a cyclic carbonate comprising at least one unsaturation and a mixture thereof, the amount of lithium difluorophosphate representing from 0.05 to 5% of the mass of the combination made up of the solvent and said at least one dissolved lithium salt, the total amount of lithium difluorophosphate and of the additive(s) representing at most 10% of the mass of the combination made up of the solvent and said at least one dissolved lithium salt.

2. The cell according to claim 1, wherein the anode comprises metallic lithium or a lithium alloy.

3. The cell according to claim 1, wherein the additive is selected from the group consisting of ethylene sulfate ESA, vinyl carbonate VC and a mixture thereof.

4. The cell according to claim 1, wherein the mass percentage of $LiPO_2F_2$ ranges from 0.05 to 2% of the mass of the combination made up of the solvent and said at least one salt.

5. The cell according to claim 4, wherein the lithium salt is lithium hexafluorophosphate $LiPF_6$.

6. The cell according to claim 4, wherein the mass percentage of $LiPO_2F_2$ ranges from 0.1 to 1% of the mass of the combination made up of the solvent and said at least one salt.

7. The cell according to claim 1, wherein the solvent is free of non-fluorinated carbonate.

8. The cell according to claim 1, wherein the cathode comprises a cathodic active material operating at a potential greater than 4.5 V with respect to the $Li^+/Li$ couple.

9. The cell according to claim 8, wherein the cathodic active material has the formula $Li_xMn_{2-y-z}M'_yM''_zO_4$ (LMO), where M' and M" are selected from the group consisting of B, Mg, Al, Si, Ca, Ti, V, Cr, Fe, Co, Ni, Cu, Zn, Y, Zr, Nb and Mo; M' and M" being different from each other, and $1 \leq x \leq 1.4$; $0 \leq y \leq 0.6$; $0 \leq z \leq 0.2$.

10. The cell according to claim 9, wherein the cathodic active material has a disordered crystalline structure.

11. The cell according to claim 9, wherein the electrolyte composition comprises:

a solvent comprising a mixture of 1,1,1,3,3,3-hexafluoro-2-methoxypropane (HFMP) and/or 1,1,1,3,3,3-hexafluoro-2-(fluoromethoxy) propane (HFMFP), ethylene monofluorocarbonate (F1EC) and 2,2,2-trifluoroethyl acetate (F3EA);

lithium hexafluorophosphate $LiPF_6$ as salt;

lithium difluorophosphate $LiPO_2F_2$ as an additive.

12. The cell according to claim 11, wherein 1,1,1,3,3,3-hexafluoro-2-methoxypropane (HFMP) and/or 1,1,1,3,3,3-hexafluoro-2-(fluoromethoxy) propane (HFMFP) represents 10 to 50% of the volume of solvent.

13. The cell according to claim 12, wherein 1,1,1,3,3,3-hexafluoro-2-methoxypropane (HFMP) and/or 1,1,1,3,3,3-hexafluoro-2-(fluoromethoxy) propane (HFMFP) represents 15 to 40% of the volume of solvent.

14. The cell according to claim 13, wherein 1,1,1,3,3,3-hexafluoro-2-methoxypropane (HFMP) and/or 1,1,1,3,3,3-hexafluoro-2-(fluoromethoxy) propane (HFMFP) represents 20 to 30% of the volume of solvent.

15. The cell according to claim 11, wherein:

1,1,1,3,3,3-hexafluoro-2-methoxypropane (HFMP) and/or 1,1,1,3,3,3-hexafluoro-2-(fluoromethoxy) propane (HFMFP) represents 20 to 30% of the volume of solvent, ethylene monofluorocarbonate (F1EC) represents 15 to 40% of the volume of solvent, 2,2,2-trifluoroethyl acetate (F3EA) represents 30 to 50% of the volume of solvent.

16. The cell according to claim 8, wherein the cathode comprises a mixture of two cathodic active materials, the first having a disordered crystalline structure, the second having an ordered crystalline structure.

17. A method comprising the step of cycling the cell according to claim 1.

18. The method according to claim 17, wherein the cycling is carried out at a temperature above 25° C.

* * * * *